Nov. 3, 1964  F. G. PRESNELL  3,155,111
TEMPERATURE COMPENSATED FLOW CONTROL VALVE
Filed Aug. 29, 1963
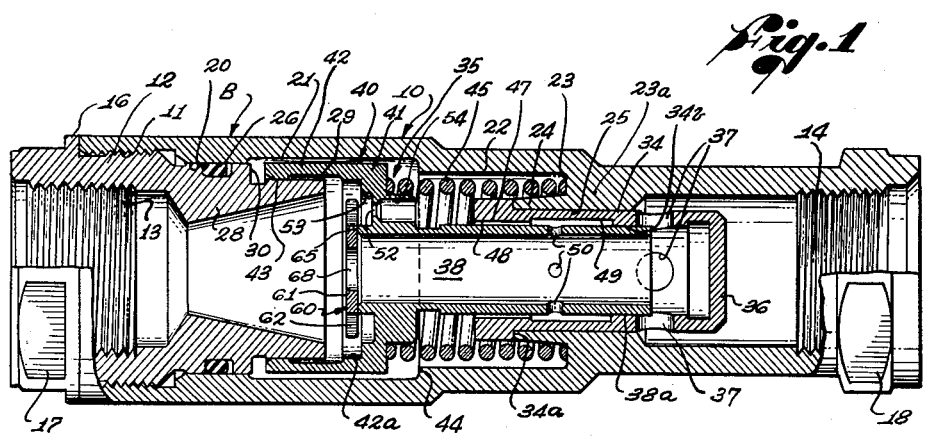
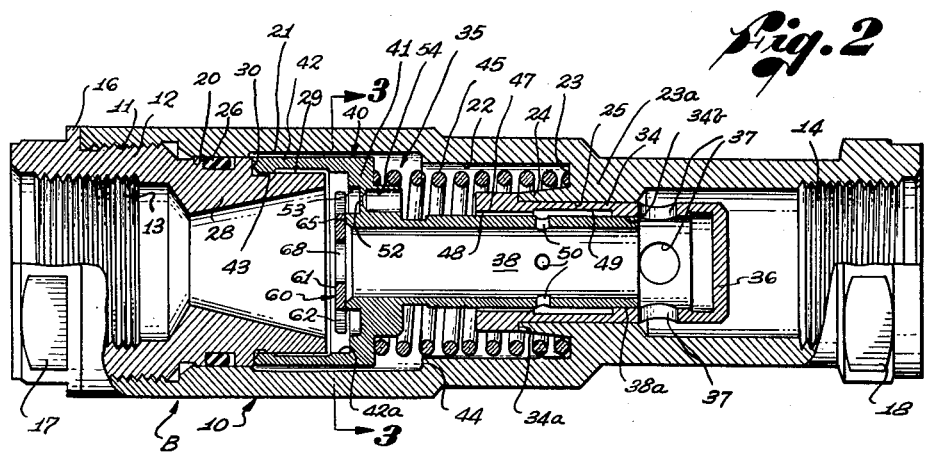
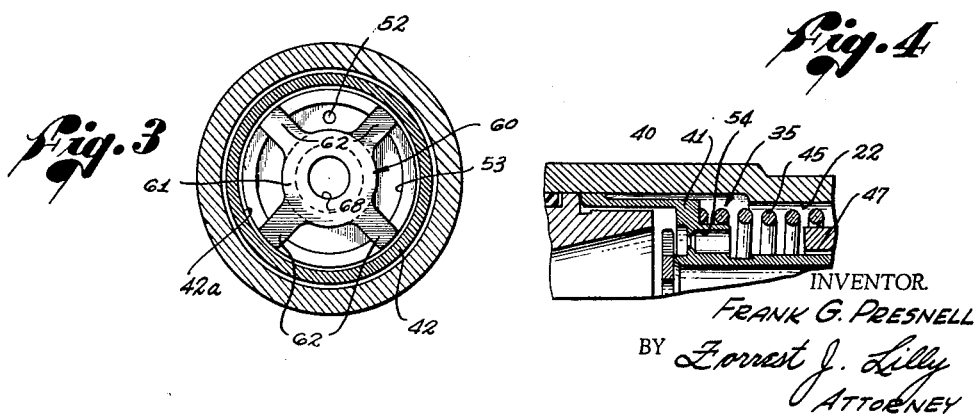
INVENTOR.
FRANK G. PRESNELL
BY Forrest J. Lilly
ATTORNEY

3,155,111
TEMPERATURE COMPENSATED FLOW CONTROL VALVE
Frank G. Presnell, 2818 Laurel Canyon Place,
Los Angeles 46, Calif.
Filed Aug. 29, 1963, Ser. No. 305,317
3 Claims. (Cl. 137—504)

This invention relates generally to hydraulic flow control valves of the type which limit flow to a predetermined maximum by balancing a throttling element between a spring and a force due to pressure drop across a metering orifice.

Valves of this class are commonly employed under service conditions wherein the hydraulic fluid may be, at different times, at widely different temperatures and, therefore, viscosity. Since the flow through an orifice at a given pressure drop varies with temperature, it is evident that close control of flow rate cannot be accomplished without the use of some means for compensating temperature fluctuations in the hydraulic fluid.

It is, therefore, an object of the invention to provide a novel control valve of the class mentioned, incorporating a means by which compensation is made for temperature changes in the hydraulic fluid, so as to achieve a substantially constant flow rate with pressure changes across the valve throughout a substantial range of temperature of the hydraulic fluid.

The improvements comprising the invention may best be understood from the following detailed description of present preferred embodiments of the valve, reference being had to the accompanying drawing, in which:

FIG. 1 is a longitudinal sectonal view through a valve in accordance with the invention, shown in operative forward flow position;

FIG. 2 is a view similar to FIG. 1, but showing the valve in an inactive position;

FIG. 3 is a section on line 3—3 of FIG. 2; and

FIG. 4 shows a modification of the valve of FIGS. 1–3.

In the drawings, the numeral 10 designates a cylindrical body member, formed in one end with a threaded bore 11 to receive an externally threaded cap 12, which, together with member 11, completes the body of the valve. For lightness, and for an additional reason to appear hereinafter, the body member 10 and cap 12 are preferably composed of aluminum. The cap 12 is formed with a threaded inlet port 13, and the opposite end of body member 10 is formed with a threaded outlet port 14, for making up in a hydraulic line. Cap 12 has a flange 16 which abuts the end of body member 10, and is formed outside said flange with wrench flats 17. Similar wrench flats 18 are formed on the end of body member 10 that is remote from cap 12. These facilitate screwing of the cap 12 into body member 10, and the making up of the valve in the hydraulic line.

More 11 is continued inwardly into body member 10 by an unthreaded finished bore 20, beyond which is an enlarged relief bore 21, followed by a reduced bore 22. The latter extends to an annular shoulder 23 formed on an intermediate transverse body wall 23a. Formed on this wall 23a, inside of shoulder 23, is a forwardly projecting annular flange or ring 24. This flange 24 bounds or defines a reduced axial body bore 25 that extends through wall 23a to meet the aforementioned port 14.

The cap 12 is sealed to body member 10 by O-ring 26 in contact with the finished surface of bore 20. This cap 12 has an inward extension 28 affording an external cylindrical bearing surface 29, and at the base of surface 29, an annular stop shoulder 30. The bearing surface 29 is annularly spaced inside bore 21 to accommodate a presently described piston. The inner end of this extension 28 functions to cage a later described poppet.

A hardened tubular liner or cup 34 is pressed into and extends through bore 25 in wall 23a. This liner or cup 34 has its open end within a body chamber 35. The open end portion of this cup has a shoulder 34a, which engages the abutment afforded by the end of flange 24, by which it is properly positioned. The opposite end portion or "bottom" of this cup extends beyond bore 25 into port 14, and is here shown as closed by wall 36. However, the wall need not be a complete closure, and it is possible to provide a small port therein so as to pass a small fluid flow even though the presently described throttling ports are closed. This is a sometimes specified safety feature in a flow control valve, permitting some flow even though the valve may be stuck in a shut-off position. The cup 34 has lateral throttling ports 37 opening to port 14. It is formed near wall 36 with an internal cylindrical slide bearing surface 34b for a cylindrical bearing surface 38a on the rearward end portion of a longitudinally slidable throttling sleeve 38 telescopically received therein. This sleeve 38, which is preferably reduced slightly forwardly of bearing surface 38a, has adjacent its forward end, i.e., its end nearest cap 12, a hollow piston 40, comprised of an annular wall 41 extending radially outward from the end of sleeve 38, and a cylindrical wall or sleeve portion 42 projecting in the direction of the valve inlet from the periphery of wall 41. Wall 42 has, adjacent its axial extremity, an internal cylindrical bearing surface or land 43 which is slidably fitted on the aforementioned external cylindrical bearing surface 29 on cap portion 28. To assure desirable strength and wear resistance, and for a further reason to be described hereinafter, the sleeve and piston member 38, 40 are preferably made of steel.

As mentioned earlier, the open end of cup 34 opens inside a body chamber 35, and this chamber 35 is defined at one end by a body partition means comprised, in this instance, of the side wall of said cup together with body wall 23a in which the cup is seated. Chamber 35 is further defined by bores 21 and 22, and the land 43 riding on bearing surface 29.

The extremity of piston wall 42 is engageable against cap shoulder 30 as a stop, and the piston has a suitable range of axial travel with bearing surface 43 in sliding engagement with cap surface 29. This travel is limited by body shoulder 44, at the juncture of bores 21 and 22, which is engageable by piston 40 under certain conditions.

A coil compression spring 45 surrounds sleeve 38, seating at one end on body shoulder 23, and engaging at its opposite end behind piston 40. This compression spring urges the piston 40 and sleeve 38 towards the position of FIG. 2, where the piston is engaged with the cap. During regulated flow, the piston 40, under the influence of certain pressure differentials operating thereon, moves against spring 45 to an operating position such as illustrated in FIG. 1, where the end of sleeve 38 partially closes throttling ports 37, and thus adjusts the flow rate through the valve.

Cup 34 has, adjacent its open end, a bore 47 whose surface is spaced from the opposed surface of sleeve 38 by a small clearance distance. This clearance, and the length of the bore 47, are made such as to afford a long and narrow or constricted flow passage 48, so that its resistance to flow is primarily viscous. The passage 48 leads from body chamber 35 to an enlarged recess or relief 49, of dimensions large enough to avoid viscous-type flow resistance. Ports 50 formed radially in sleeve 38 communicate directly with relief 49 in all positions of sleeve 38, and complete a flow passageway from chamber 35 to the interior of the sleeve, and thus to throttling ports 37 and discharge port 14.

A small orifice 52 is formed in the wall 41 of piston 40, establishing communication between inlet port 13 and body chamber 35. As here shown, the front face of the piston is formed with an annular recess 53, and the orifice 52 extends from the bottom of this recess to a bore 54 drilled into the opposite side of the piston. This orifice 52 is short and so formed that its resistance to flow is primarily dynamic as distinguished from viscous.

The hollow piston 40 receives for limited movement therein a plate-like poppet valve 60, comprised of a central valve disk 61 and radially projecting arms 62 guided for sliding movement by the inner cylindric surface 42a of the outer piston wall 42 adjacent the base of the latter. The valve disk 61 is thus engageable with an annular seat 65 on the adjacent extremity of sleeve 38, this seat 65 being positioned forwardly of the front face of piston wall 41, so that the valve disk engages seat 65 rather than wall 41.

An orifice 68 is formed in poppet valve 60, and passes the main fluid flow from the valve inlet port to the interior of sleeve 38. A substantially smaller flow of bypass fluid takes place at all times from the valve inlet through orifice 52 to chamber 35, and from the latter via passage 48, relief 49 and ports 50 to the interior of the sleeve. It will be evident that, owing to the presence of the enlarged passage or relief 49, which presents virtually no viscous flow resistance, the length of the viscous flow path, i.e., that of large viscous resistance, is the length of passage 48, which is thereby fixed. The small flow of bypass fluid, rather than the main flow through orifice 68, produces the condition of pressure differential acting on piston 40 which is primarily responsible for the throttling action of the valve, as will appear presently.

When reverse flow takes place through the valve, the poppet is forced off its seat, and at such time the cap extension 28 functions to stop or cage the poppet. It will be evident that the arms 62 are of a length to engage the end of cap extension 28 at this time. It will also be clear that large fluid flow passages are at this time provided from the end of sleeve 34 through the spaces between poppet arms 62 in engagement with the cap extension 28, to the port within the latter.

In operation for forward flow, flow from inlet to outlet divides into a primary flow through orifice 68 into the fluid flow space in sleeve 38; and a bypass flow through orifice 52, spring chamber 35 constituting a secondary fluid flow space, viscous flow passage 48, recess 49 and sleeve holes 50 into the interior of sleeve 38, where it recombines with the primary flow. Obviously the pressure drop of both flows must be the same.

In the primary flow, pressure loss from the downstream side of orifice 68 to the point where sleeve holes 50 communicate with the interior of sleeve 38 is insignificant, and the pressure drop of the primary flow is substantially that of orifice 68 alone.

In the bypass flow, pressure loss is insignificant in spring chamber 35, recess 49 and holes 50, and the pressure drop of the bypass flow is substantially the sum of the pressure drops across orifice 52 and viscous flow passage 48. Passage 48 preferably is so proportioned in respect to orifice 52 as to offer negligible resistance to bypass flow when the hydraulic fluid is warm and its viscosity low. With passage 48 so proportioned, and the hydraulic fluid warm, the pressure drop of the bypass flow will be substantially that of orifice 52 alone, and the pressure drops across orifices 68 and 52 will be substantially identical.

Pressure drop across orifice 68 acts on sleeve 38 over the cross-sectional area of the outside diameter of the cup end of sleeve 38 (right-hand end in FIG. 2) minus the area of orifice 68, or on a net area hereby termed area "A," and imposes on sleeve 38 a force tending to move sleeve 38 to the right against spring 45. Pressure drop across orifice 52 acts on sleeve 38 over the cross-sectional area of the outside diameter of the cylindrical cap extension upon which land 43 of sleeve 38 is in close sliding engagement, minus the cross-sectional area of the outside diameter of the cup end of sleeve 38, minus the area of orifice 52, or upon a net area hereby termed area "B" and imposes on sleeve 38 a force also tending to move sleeve 38 to the right against spring 45. Area B will be seen to be much larger than area A.

With the pressure drops across orifices 68 and 52 substantially the same, the forces on areas A and B are proportional to their areas. These forces are additive and proportional to orifice pressure drop, which, in turn, is proportional to the square of the total flow. Thus the total force on sleeve 38 tending to move this sleeve to the right is proportional to the square of the total flow, and at a total flow which depends upon the size of orifices 68 and 52, the magnitude of areas A and B, and the force exerted by spring 45, the pressure drop force on sleeve 38 will move this sleeve to the right against the spring to a position at which the end of sleeve 38 throttles ports 37 to the extent required to prevent flow through the valve from being greater at the pressure drop existing across the valve.

Now should the pressure drop across the valve increase due to an increase in pressure at the valve inlet or a decrease in pressure at the valve outlet, flow through the valve will tend to increase, but the valve will permit only the very slight increase in flow required to impose on sleeve 38 the small additional pressure drop force which will cause this sleeve to move still further to the right against spring 45 to a position at which the end of sleeve 38 will still further throttle ports 37 to the extent required to prevent flow through the valve from exceeding this slightly higher volume at the now existing higher pressure drop across the valve.

Conversely, should the pressure drop across the valve decrease, flow through the valve will tend to diminish, but a very slight decrease in flow will reduce the pressure drop force on sleeve 38 sufficiently for spring 45 to move this sleeve to the left to a position at which the throttling of ports 37 by the end of sleeve 38 is reduced to the extent required to permit flow through the valve to be maintained at this slightly lower volume at the now existing lower pressure drop across the valve, assuming that the pressure drop across the valve is adequate to prevent marked reduction in flow through the valve even with ports 37 completely open.

In short, the valve tends to throttle flow to the flow which exerts a given pressure drop force on sleeve 38.

This being so, assume the hydraulic fluid to be cold, and its viscosity high. Suppose the flow from bypass orifice 52 were to pass directly from spring chamber 35 into the interior of sleeve 38 without having to traverse viscous flow passage 48. Then with the viscosity of the hydraulic fluid high, flow through orifices 68 and 52 at any given pressure drop across these orifices would be lower than the flow therethrough at the same pressure drop with the hydraulic fluid warm, and of low viscosity. Thus when the hydraulic fluid is cold, a smaller flow would exert the given pressure drop force on sleeve 38, and the valve would tend to throttle flow to this smaller flow.

However, flow from bypass orifice 52 must traverse viscous flow passage 48, whose resistance to flow is negligible when viscosity is low, but large when viscosity is high. Thus with the pressure drop across the bypass flow path still necessarily the same as the pressure drop across orifice 68, the pressure drop across orifice 52 alone will be less than the pressure drop across orifice 68, and, at a given pressure drop across orifice 68, there will be a reduction in total pressure drop force on sleeve 38, because while area A will be subjected to the full pressure drop across orifice 68, the ordinarily much larger area B will be subjected to the lower pressure drop across orifice 52. Thus with fluid viscosity high, a pressure drop force on sleeve 38 sufficient to move this sleeve to the right against spring 45 results only when pressure drop across orifice 68 is higher than that which will give the same pressure drop force on sleeve 38 when fluid viscosity is low. Areas A and B, spring 45, orifices 68 and 52, and viscous flow passage 48 are properly proportioned in relation to each other so that the low temperature, high viscosity pressure drop across orifice 68 will be just enough higher than the high temperature, low viscosity pressure drop across this orifice to maintain the total low temperature regulated flow the same as the total high temperature regulated flow. Perfect compensation over the entire viscosity range may not be obtainable, but closely approximate compensation can be achieved readily.

In practice, calibration for different regulated flows ordinarily will involve only a change in the size of orifice 68, and will require no modification of areas A and B, the spring, orifice 52, or the viscous flow passage 48.

It may be noted that while, at low fluid temperature and high fluid viscosity, there is an increase in the pressure drop across orifice 68 and consequently an identical increase across the bypass flow path, bypass flow will decrease because of the much increased resistance of viscous flow passage 48, as it is only by decreasing bypass flow that the increased resistance of passage 48 could decrease pressure drop across orifice 52, and that for perfect compensation of total flow the flow through orifice 68 must increase somewhat. Ordinarily the bypass flow will be small in relation to the main flow through orifice 68, and the required increase in flow through orifice 68 will be small, and readily obtainable.

By design, bypass flow ordinarily will be small in relation to the flow through orifice 68 because otherwise it would be difficult to provide a viscous flow passage 48 of the desired characteristics without increasing the overall size of the valve. With the bypass flow relatively small, leakage past the piston end of sleeve 38 could have a serious unfavorable effect on both flow regulation and temperature compensation.

It is possible to have the piston end of sleeve 38 work in the body bore rather than on the cylindrical extension of the cap, as in FIG. 4, and referred to in more particular hereinafter. With both sleeve and body of the same material, clearance between sleeve and body would not change with temperature, but leakage between sleeve and body would be greater at high temperature than at low because of difference in fluid viscosity. Since this would be a temperature effect, it might be compensated for by the proportioning of orifice 52 and passage 48 relative to each other. With sleeve 38 of steel, as is desirable from considerations of strength and wear resistance, and the body of aluminum alloy as is desirable in aircraft use to minimize weight, sleeve-body clearance would increase at high temperature, the change in leakage flow over the temperature range would be aggravated, and compensation by the relative proportioning of orifice 52 and passage 48 would be more difficult. However, sleeve-body clearance, and hence leakage, would change with system pressure also because of the expansion of the body at high pressures, and since this change would not be related to temperature, no compensation would be possible by the relative proportioning of orifice 52 and passage 48.

This difficulty is overcome in the arrangement of FIGS. 1–3 by making the piston portion of sleeve 38 work on a cylindrical extension of the cap. With the sleeve of steel, and the cap of aluminum alloy, as is desirable if the body is aluminum, the sleeve-cap clearance is a minimum at high temperature when fluid viscosity is low, and a maximum at low temperature when fluid viscosity is high, and thus leakage between cap and sleeve is both approximately stabilized over the entire temperature range, and held to values so low as to be insignificant. More important, the pressure drop across the sleeve is only that of orifice 52, which, on the order of 50 or 100 p.s.i., is too small to cause expansion giving any appreciable change in clearance.

However, it should be noted that, as previously stated, it is possible to have sleeve 38 work in the body bore rather than on the cap extension. If the body wall is sufficiently thick, or if during operation there is little change in system pressure, such a construction may be satisfactory. In FIG. 4, showing such a construction, the bore 20a in body member 18a extends rearwardly to shoulder 44a, without relief, as in FIGS. 1–3, and affords bearing for a cylindric exterior bearing surface 43a on the outside of the forward end of piston 40a. Otherwise, the valve may be identical with the valve of FIGS. 1–3, and corresponding parts are identified by corresponding reference numerals.

It will be understood that the drawings and description are of present preferred illustrative embodiments of the invention, and that various changes in design structure, and arrangement may be made without departing from the spirit and scope of the appended claims.

I claim:

1. In a temperature compensated flow control valve, a hollow valve body having an inlet at one end and an outlet at the other, a throttling sleeve longitudinally movable in said body, an enlarged piston on said sleeve at the inlet end of said body, said piston having a coaxial cylindrical bearing surface, a complementary cylindrical bearing surface on the inlet end of said body in sliding engagement with said bearing surface on said piston, wall means on said body surrounding the opposite end portion of said sleeve and affording a slide bearing therefor, there being a chamber in said body outside said sleeve between said wall means and said complementary engaging bearing surfaces on said body and piston, a spring in said body urging said sleeve toward said inlet, throttling port means cooperable with said throttling sleeve affording a throttling port leading from the interior of said sleeve to said outlet and controlled by said sleeve, wall means across said sleeve affording a metering orifice between said valve inlet and the interior of said sleeve, a dynamic flow orifice leading through said piston from said inlet to said chamber, and means forming a constricted flow passage offering resistance to flow of viscous fluid leading from said chamber to the interior of said sleeve.

2. In a temperature compensated flow control valve, a hollow valve body having an inlet at one end and an outlet at the other, a throttling sleeve longitudinally movable in said body, an enlarged piston extending from said sleeve at the inlet end of said body, said piston having a coaxial cylindrical bearing surface, a complementary cylindrical bearing surface on the inlet end of said body in sliding engagement with said bearing surface on said piston, partition means in and across said hollow body outside of and surrounding said sleeve and having a bore therein affording a slide bearing for said sleeve, there being a chamber in said body outside said sleeve between said partition means at one end and said complementary engaging bearing surfaces on said body and piston adjacent the other end, and there being a dynamic flow orifice between said inlet and said chamber, said partition means having a fluid recess therein adjacent said sleeve, towards the valve inlet from said slide bearing, said sleeve having a fluid port therethrough between said recess and the interior of said sleeve, and there being a flow passage between said partition wall means and said sleeve from said chamber to said recess offering resistance to the flow of viscous fluid, said recess being dimensioned to afford a flow passage to avoid flow resistance for viscous fluid flow from said flow passage to said fluid port, means affording a dynamic flow orifice between said inlet and the interior of said sleeve, a spring in said body urging said sleeve toward said inlet, and throttling port means cooperable with said throttling sleeve affording a throttling port leading from the interior of said sleeve to said outlet and controlled by said sleeve.

3. In a temperature compensated flow control valve, the combination of: means forming a main flow passage having an inlet and an outlet, means forming a metering orifice in said passage, a movable throttling means movable across and controlling said main flow passage, a spring acting on said throttling means to move it in a direction to open said passage, a movable pressure differential response means operatively connected to said throttling means and including first and second opposed surfaces adapted for exposure to fluids under pressure, said surfaces being so arranged that pressure fluid acting on said first surface tends to move said pressure differential response means and throttling means to close said main flow passage, and pressure fluid acting on said second surface tends to move said response means and throttling means to open said main flow passage, means forming first and second fluid chambers in communication with said opposed first and second surfaces, respectively, means intercommunicating said first fluid chamber with said main flow passage at a point upstream of said metering orifice, meanns forming a fluid passageway intercommunicating said first and second fluid chambers, there being a dynamic fluid flow orifice in said passageway, means forming a fluid passageway intercommunicating said second fluid chamber with said main flow passage at a point which is on the same side of said throttling means as said metering orifice and which is downstream of said metering orifice.

References Cited in the file of this patent

UNITED STATES PATENTS

| | | |
|---|---|---|
| 2,139,050 | Vickers | Dec. 6, 1938 |
| 2,255,787 | Kendrick | Sept. 16, 1941 |
| 2,895,500 | Barnett | July 21, 1959 |
| 3,130,747 | Benaway | Apr. 28, 1964 |